United States Patent [19]

Cotten

[11] 4,179,999

[45] Dec. 25, 1979

[54] HATCH COVER CLOSURE SYSTEM

[75] Inventor: Soule E. Cotten, Orange, Tex.

[73] Assignee: E. I. Du Pont de Nemours and Company, Wilmington, Del.

[21] Appl. No.: 889,206

[22] Filed: Mar. 23, 1978

[51] Int. Cl.² .............................................. B61D 39/00
[52] U.S. Cl. ................................ 105/377; 292/259 R; 292/256.5
[58] Field of Search ................ 105/377; 49/386; 220/323; 292/259, 256.5

[56] References Cited

U.S. PATENT DOCUMENTS

| | | | |
|---|---|---|---|
| 2,360,533 | 10/1944 | Zeidler | 105/377 |
| 2,647,473 | 8/1953 | Lunde | 105/377 |
| 2,745,362 | 5/1956 | Lunde | 105/377 |
| 2,816,683 | 12/1957 | Miers et al. | 105/377 |
| 2,873,696 | 2/1959 | Cisco | 105/377 |
| 3,228,353 | 1/1966 | Carney, Jr. | 105/377 |
| 3,352,447 | 11/1967 | Hahn | 220/323 |
| 3,934,518 | 1/1976 | Adler | 105/377 |

*Primary Examiner*—Trygve M. Blix
*Assistant Examiner*—Lawrence E. Williams

[57] ABSTRACT

A hatch cover closure system for use on hopper cars. A flexible resilient strap is used to secure a hatch cover, the strap and hatch cover being coupled together by a floating link and raised and lowered as a unit about a hatch cover hinge. A slidably mounted U-bolt is used to exert a force on an end of the strap which, in turn, forces the cover to the housing.

4 Claims, 6 Drawing Figures

U.S. Patent Dec. 25, 1979 Sheet 1 of 2 4,179,999
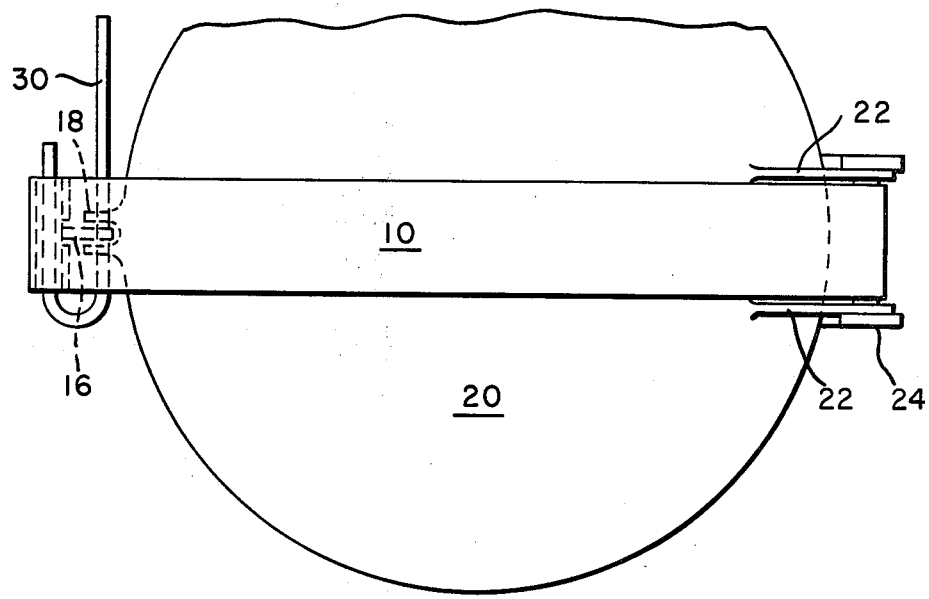
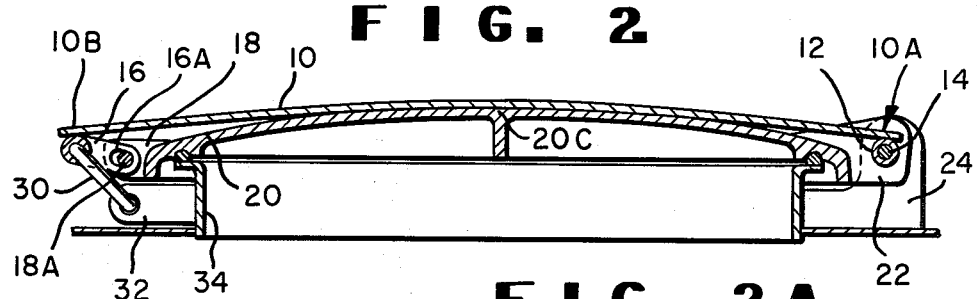
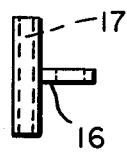
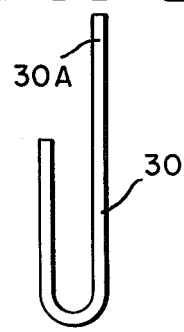

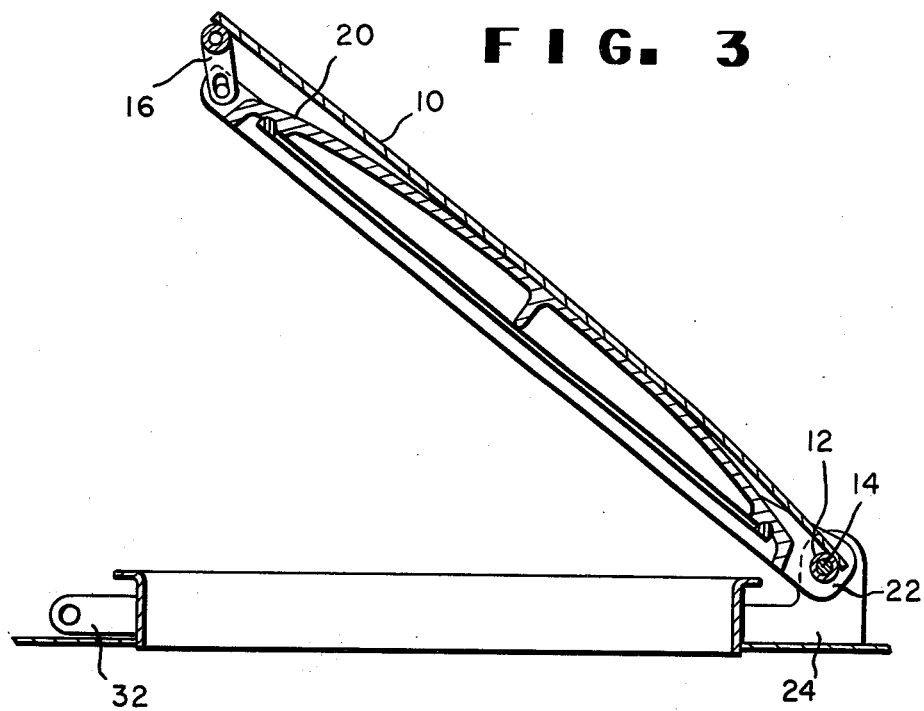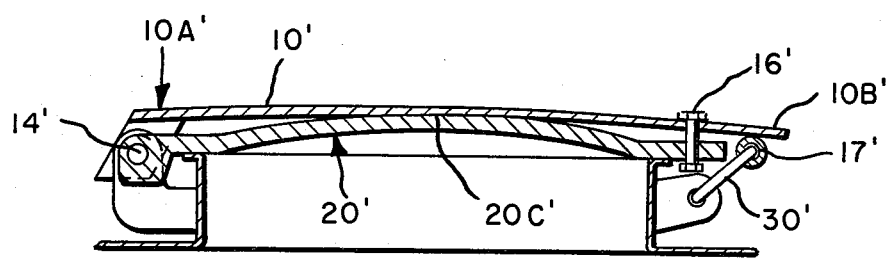

1

HATCH COVER CLOSURE SYSTEM

DESCRIPTION

1. Technical Field

This invention relates to apparatus for the securement of hatch covers, particularly to the type utilized in railroad hopper cars.

2. Background Art

Numerous designs have been used in hopper car hatch cover closure systems. Many, however, have required the use of complex devices which have been expensive to fabricate and install. Moreover, many configurations have required rather bulky and/or heavy construction materials, and have thus been awkward to operate, and poorly adapted to quick, simple replacement and maintenance.

Additionally, many designs have been plagued by short-lived mechanical seals during field use. For example, the design disclosed in FIGS. 4 and 5 of U.S. Pat. No. 3,228,353, issued to J. L. Carney, Jr., utilizes three handwheels threaded to hinged eyebolts for securement of hatch covers. In addition to being costly to maintain, this type of design has given rise to warped hatch covers resulting from uneven tightening of the handwheels. The consequence has been rapid deterioration of the mechanical seals with resulting contamination of the products carried in the hopper cars involved.

Carney also discloses a hatch closure mechanism utilizing a strap design (see FIGS. 2 and 3 therein), but the strap is rigidly connected by bolt and nut to the top center of the hatch cover. Thus, the strap must be strong enough to carry the weight of the hatch cover, and in addition, the hatch cover must be strong enough to permit its total weight to be supported by its top center-most point without deforming in service.

DISCLOSURE OF INVENTION

The hatch cover closure device of this invention utilizes a simple resilient flexible strap, having one end which is hinged to a fixed point adjacent to the hatch opening. The second end of the strap is connected to the hatch cover by a floating link, which allows for relative movement between the strap and hatch cover. When the strap is lifted from the secured position, the hatch cover is raised via the floating link. A slidably mounted U-bolt is used to secure the strap and hatch cover to the hatch opening.

In the secured position, the strap of the device extends diametrically across the top of the hatch cover. The strap exerts an applied force to the center-most portion of a hatch cover having a convex top surface, effecting thereby a forced-fit mechanical seal between the hatch cover and hatch opening.

BRIEF DESCRIPTION OF THE DRAWINGS

In the drawings,

FIG. 1 is a plan fragmentary view of the hatch cover closure device of a preferred embodiment of this invention in the secured position;

FIG. 1A is a plan sectional view of a T-link used as part of the same embodiment;

FIG. 2 is an elevation sectional view of the hatch cover closure device of FIG. 1;

FIG. 2A is a plan view of a U-bolt used in securement of the hatch cover;

FIG. 3 is an elevation sectional view of the embodiment of FIG. 2 in an unsecured, raised position; and FIG. 4 is an elevation sectional view of a second preferred embodiment in its secured position.

BEST MODE FOR CARRYING OUT THE INVENTION

This invention relates to a simple hatch cover closure device made of an assembly of light weight parts. The parts can be easily formed from inexpensive stock materials. Two preferred embodiments are described.

In one preferred embodiment, the device is as shown in FIG. 1–3. A resilient flexible metal strap 10 extends diametrically over the hatch cover 20. A first end 10A of the strap is connected to sleeve 12 so as to move pivotally, about pin 14. The pin 14 is supported by journals 24.

A second end 10B of the strap 10 is attached to a floating link, viz., the T-link 16. The T-link 16 is loosely attached to a pair of eyelets 18 by bolt 18A and nut (not shown). The eyelets 18 are integrally appended to the hatch cover 20 (typically as part of the hatch cover casting).

The hatch cover 20 and strap 10 are thus coupled to each other via T-link 16. Upon raising the strap 10 from the secured position, the hatch cover follows, thus the strap and cover function together as a loosely coupled unit. The hatch cover 20 has a pair of extensions 22 which are pivotally mounted on pin 14.

For effecting securement of the hinged strap and cover assembly to the hatch housing this invention utilizes a U-bolt 30 as shown in FIGS. 1, 2 and 2A. The T-link 16 has a hollow top portion 17 as shown in FIG. 1A. One side of the U-bolt 30 extends through the hollow top portion 17 as shown in FIGS. 1 and 2. The other side of the U-bolt 30 extends slidably through a second pair of eyelets 32 which are rigidly affixed to the car hatch housing 34 by welded connection. The end of the U-bolt 30 which extends through eyelets 32 may optionally have some mechanism for keeping it from sliding all the way out, preferably a cotter pin, not shown, at a point about 30A (FIG. 2A). If such a provision is used, that side of the U-bolt 30 should be longer than the side which extends through the T-link, as shown in FIGS. 1 and 2A.

One feature of this invention is that the strap contacts the center-most portion 20C of the hatch cover when the hatch cover 20 and strap 10 are in the secured position, thus exerting thereon an applied mechanical force. As a result, a physical force is required to manually hold the strap in position for insertion of the locking mechanism. The length and resilience of the strap 10 are designed so that an operator can press his foot against the second end 10B of the strap 10 to position the strap with respect to the eyelets 32 so that the U-bolt 30 may be inserted through the hollow portion 17 of T-link 16 for securement. Link 16 has a slotted opening 16A shown in FIG. 2 which allows necessary relative movement between link 16 and eyelets 18 during the above-described securement step. In addition, although relative movement is necessary between the strap 10 and cover 20, it is preferred that such relative movement be minimal to reduce wear and to provide for easier handling as the cover assembly is raised and lowered. This latter condition may be effected by slightly prestressing the strap during its assembly to the hatch cover via the T-link 16. The strap and cover thereby remain in virtual contact with each other at all times during the raising and lowering of the cover assembly. FIG. 3 shows the strap and cover in contact while the assembly is in the raised position.

In a second preferred embodiment, the device is as depicted in FIG. 4. Note that in this embodiment, the U-bolt 30' slides into a tube 17' welded to strap end 10B'. The floating link consists of the bolt and nut coupling 16' which connects the strap to the cover. The coupling is adjusted loosely enough to (1) allow relative movement between the strap 10 and hatch cover 20, and (2) allow the slidably mounted U-bolt 30' to forcibly retain the strap and cover in a secured position. However, the coupling adjustment should preferably be tight enough to maintain the contact between the strap 10' and the center-most portion 20C' of the hatch cover during raising and lowering of the strap and hatch cover.

Industrial Applicability

A prime feature of this invention is the extent to which it lends itself to retrofitting of damaged or inoperable conventional hatch closure devices. As pointed out earlier, most hopper car hatch closure devices, and especially those used in railway hopper cars, utilize the handwheel type of system referred to in FIGS. 4 and 5 of Carney, U.S. Pat. No. 3,228,353. Replacement of the handwheel system with the device disclosed herein involves only (a) the removal of the handwheel assemblies, (b) the affixing of the described flexible resilient strap to the existing hinge, and (c) connecting the floating link to the strap and hatch cover. Each of these steps is amenable to in-field application.

Having thus described the invention what is claimed is:

1. In a hopper car having a hatch housing and a hatch cover which is hinged to the car, a closure device comprising:
   a resilient flexible strap having first and second ends,
   said first end of strap being hinged to the car at or about same location as the hatch cover is hinged,
   a floating link connecting said second end of the strap to the hatch cover, said link allowing for movement between the strap and cover, and
   a slide bolt for securing said second end of the strap to the hatch housing, said strap and housing having means for receiving the bolt when the cover is in place and the strap has been stressed 2. The closure device of claim 1 wherein the strap contacts the center-most portion of the top of said cover, exerting an applied force thereon when the strap and cover are secured to said housing.

3. The closure device of claim 2 wherein said floating link is a T-link having a hollow top portion pivotally connected to the strap, and said bolt extends through the hollow portion of said T-link to forcibly retain the strap and cover in said secured position.

4. The closure device of claim 2 wherein said floating link comprises a bolt and nut coupling adjusted to allow relative movement between said strap and hatch cover.

* * * * *